(12) United States Patent
Jeong

(10) Patent No.: US 6,389,237 B1
(45) Date of Patent: May 14, 2002

(54) CAMERA FOR COMPOSITE PHOTOGRAPHY

(76) Inventor: Hyun-Jeong Jeong, Art Capsule Seon-ho BLDG. 4th Floor 590-22 Sinsa-dong Kangnam-ku, Seoul (KR)

( * ) Notice: Subject to any disclaimer, the term of this patent is extended or adjusted under 35 U.S.C. 154(b) by 0 days.

(21) Appl. No.: 09/611,539

(22) Filed: Jul. 7, 2000

(30) Foreign Application Priority Data

| Jul. 8, 1999 | (KR) | 99-27382 |
| Jul. 8, 1999 | (KR) | 99-27383 |
| Nov. 23, 1999 | (KR) | 99-52163 |

(51) Int. Cl.[7] ............................................. G03B 41/00
(52) U.S. Cl. ...................................... 396/335; 396/544
(58) Field of Search .................................. 396/322, 335, 396/337, 544, 340

(56) References Cited

U.S. PATENT DOCUMENTS

| 3,719,128 A | * | 3/1973 | Simmons | 396/544 |
| 6,173,127 B1 | * | 1/2001 | Glover et al. | 396/544 |
| 6,289,181 B1 | * | 9/2001 | Lau et al. | 396/544 |

* cited by examiner

*Primary Examiner*—David M. Gray
(74) *Attorney, Agent, or Firm*—Renner, Otto, Boisselle & Sklar, LLP

(57) ABSTRACT

A camera for composite photography for easily composing an object image of a picture on a pre-developed background image by using a composite film having an exposed portion of a pre-developed background image and an unexposed portion for taking a picture. The camera for composite photography comprises a main body including a case and a back cover, a lens, a front finder window on a front face of the main body for composition, a rear finder window on a rear face of the main body for composition, a non-adjustable iris diaphragm and a compartment inside of the main body for loading a composite film.

The camera for composite photography is equipped with first and second location designators. The first location designator is inserted in front of the lens for locating an object of a picture on the composite film through the lens. The first location designator has a location designating hole. The second location designator is used for locating an object of a picture on the composite film, and disposed on either one of the front or rear finder window.

8 Claims, 3 Drawing Sheets

CAMERA FOR COMPOSITE PHOTOGRAPHY

FIELD OF THE INVENTION

The present invention relates to a portable or disposable camera for composite photography. More particularly, the portable or disposable camera uses a composite film having an exposed portion of a pre-developed background image and an unexposed portion for taking a picture.

DESCRIPTION OF PRIOR ART

When a picture is taken using a conventional camera, the object exposed includes a background which is the site where the picture is taken.

In these regards, a composite photography having a different background scene from the site where the picture is taken is necessary for special purposes, for example commercial or artistic photographs.

There are several methods of producing a composite photography consisting of a specific background scene and a picture of an object. A method of double exposure may be used at the stage of shooting pictures. A slide projecting composite method of a multiple exposure (shooting) method can be used at printing. Recently, computers have been used for composite photography to obtain a precise picture.

It is not easy for an amateur photographer to utilize conventional methods of composite photography. Only experts utilize the conventional methods of composite photography.

Double exposure methods require expensive and precise cameras for effective photography. Because background scenes of the shooting site are limited, it is hard to have various background scenes. The multiple exposure method also has disadvantage in the application of computer graphics.

The slide projecting composite method enables one to compose a desired object with various background scenes. However, the resolution of background scenes will be notably reduced. The slide projecting composite must be performed in a studio being equipped with a special camera, a screen, a slide projector and illumination. Consequently, a 35 mm portable camera or a disposable camera can not be used for the composite photography.

The multiple exposure method used at the stage of printing also requires expertise, a darkroom, and special equipment to compose a composite photography. It is difficult to compose a large size of composite photography by using the multi exposing method. Computer assisted composite photography also requires special equipment, such as a computer, a scanner and a film recorder. Only experts having capability of computer manipulation can utilize the method of computer used composite photography.

Therefore, the public up to today find it is impossible to compose a composite photography by using a 35 mm portable camera or a disposable camera.

SUMMARY OF THE INVENTION

It is therefore an object of the present invention to provide a camera for composite photography which has been developed whereby an amateur can easily photograph an object to a pre-developed background image by using composite film.

According to the present invention, there is provided a camera for composite photography, comprising a main body having a case and a back cover, a front face of the main body having a front finder window for composition and a lens, a rear face of the main body having a rear finder window for composition, a composite film being loadable inside of the main body, a non-adjustable iris diaphragm, a first location designator inserted in front of the lens for locating an object for a picture on the composite film through the lens, the first location designator having a location designating hole, and a second location designator for locating an object for a picture on the composite film, the second location designator being disposed on either one of the front or rear finder window.

DETAILED DESCRIPTION OF THE PREFERRED EMBODIMENTS

In order to achieve the above objects of the present invention, a portable or disposable camera for composite photography is described in detail with the accompanying drawings.

The portable or disposable camera for composite photography of the present invention is developed for amateurs to easily photograph an object on a pre-developed background image by using a composite film. The composite film 22 is provided with an exposed portion of a pre-developed background image and an unexposed portion for taking a picture.

Figure 1:
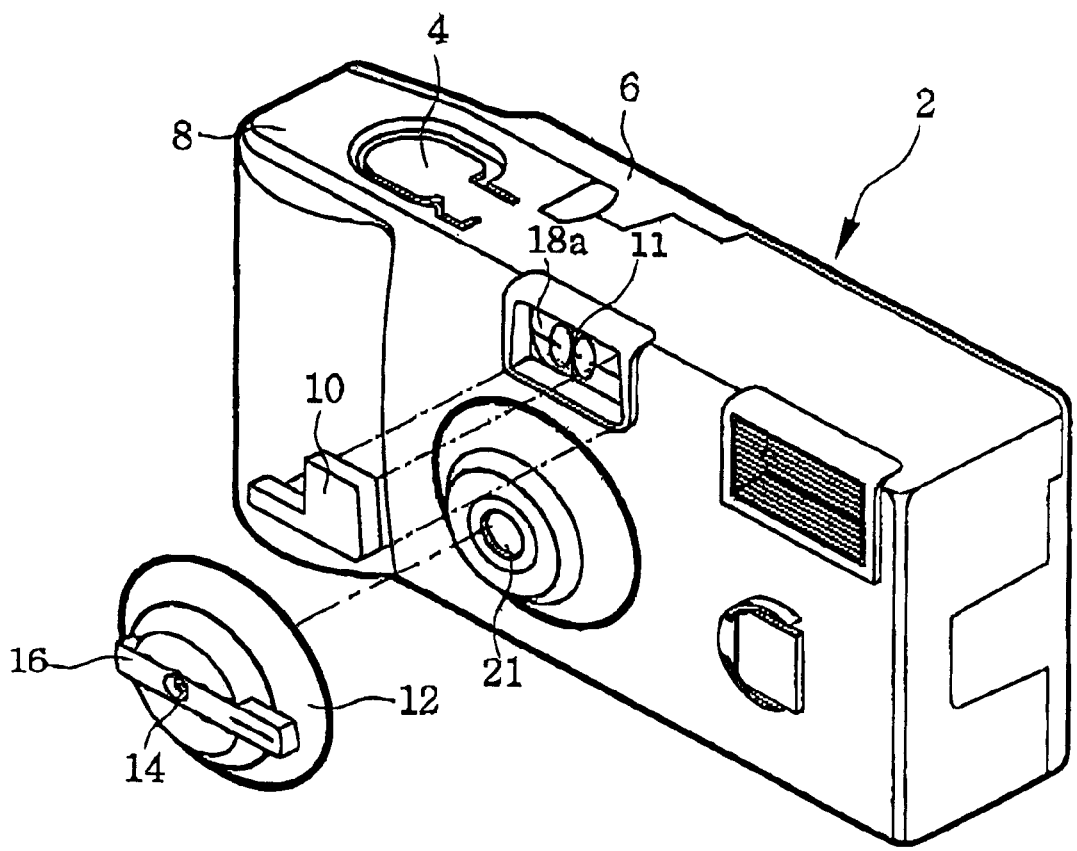
FIG. 1 shows a camera for composite photography in an embodiment of the present invention.

As shown in FIG. 1, the camera for composite photography comprises a main body 2 including a case 8 and a back cover 6, a lens 21, a front finder window 18a at a front face of the main body 2, a rear finder window 18b at a rear face of the main body 2, a non-adjustable iris diaphragm and a compartment inside of the main body 2 for loading a composite film 22.

The camera for composite photography is equipped with a first location designator 12 and a second location designator 10 to compose a secondary image of an object for precisely taking a picture on a pre-developed primary image. The first location designator 12 is inserted in front of the lens 21 being located at the center of the main body 2 for locating an object of a picture on the composite film 22 through the lens 21. The first location designator 12 has a location designating hole 14 which determines the incoming image position before the image passes through the lens. A slider 16 disposing on the first location designator 12 is able to slide along a horizontal direction for positioning the location designating hole 14 above the lens 21 to adjust the position of the object image on the composite film. The slider 16 and first location designator 12 have grooves for fixing the position. Once the position of the object image is adjusted, the slider 16 is locked at the position by the grooves.

Because the location designating hole 14 covers the lens 21, a diameter of the location designating hole 14 is smaller than that of the lens 21. The location designating hole 14 disposed on the first location designator 12 can determine the position of the incoming object image. Therefore, a photographer does not need to focus the image accurately because the primary image is positioned on the composite film. The primary image is positioned on the composite film through the location designating hole 14 being located on the first location designator 12. A proper position of the primary image on the composite film may be adjusted by moving the slider 16 disposed on the first location designator 12 along the horizontal direction.

The camera is equipped with a second location designator 10 and a composition marker 11 on a composition finder window for positioning the image on the composite film without accurate focus when a photographer takes a picture. The second location designator 10 has the same function as the first location designator 12.

The composition marker 11 is marked on the composition finder window with a cross or oval shape. The cross or oval shaped marker is set for a datum line to focus the object. It is convenient to take a picture by setting the object inside of the datum of the cross or oval shaped marker.

As shown in FIG. 1, the second location designator 10 is formed by cutting off a corner portion. The location of the cut portion may be adjusted depending on the primary image position on the composite film at the stage of production. The second location designator 10 could be disposed on either one of the front 18a or rear composition finder window 18b. However, it is preferable to locate the second location designator 10 at the front composition finder window 18a, because it is convenient for a user and so as not to block the user's sight.

Once the second location designator 10 is located on either one of the front composition finder window 18a or rear composition finder window 18b, it will block the pre-developed portion of the composite film. Consequently, the camera user could see the object through the remaining portion of composition finder window for taking a picture.

Figure 2:
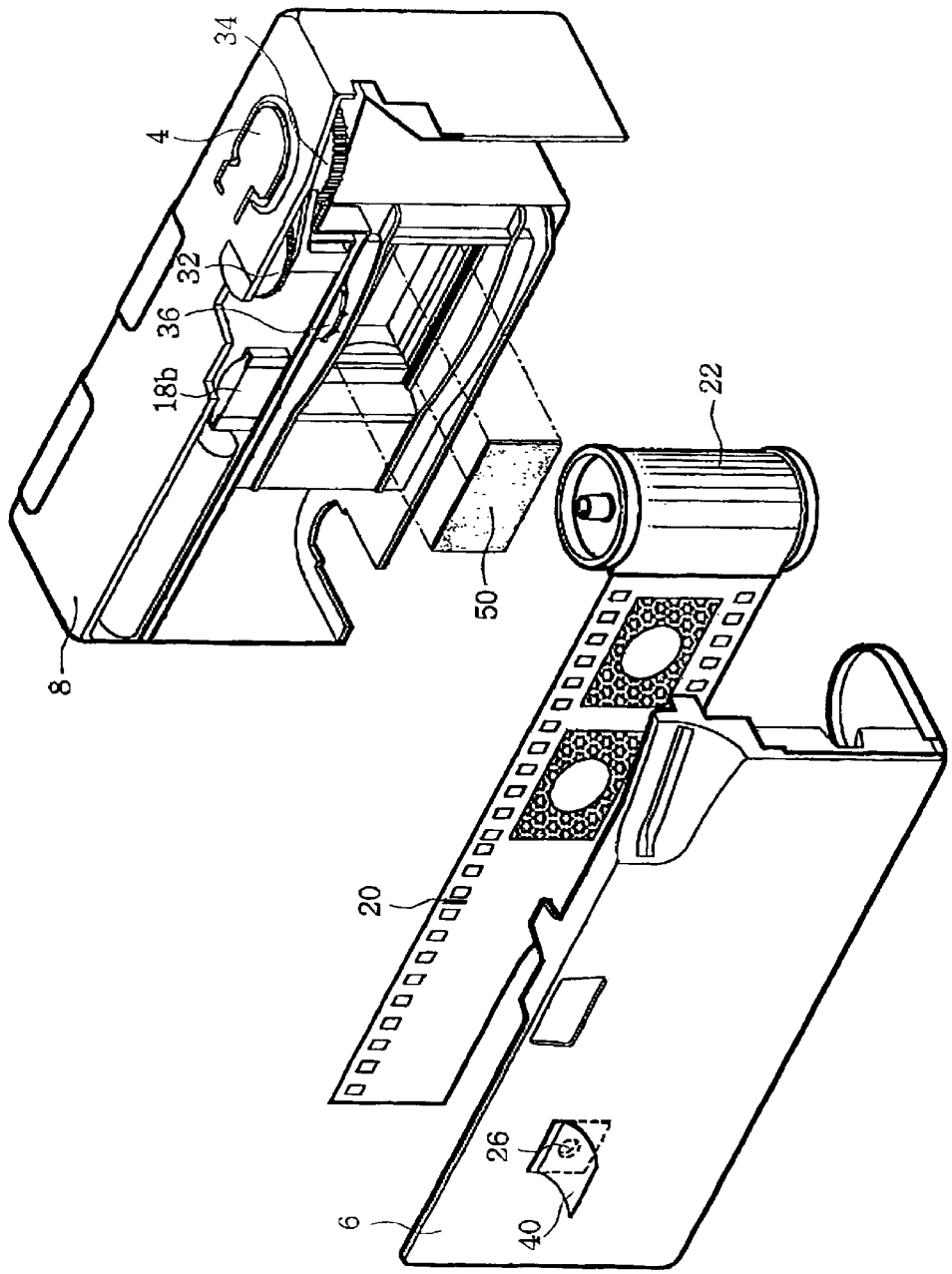
FIG. 2 shows a disassembled camera for composite photography of the present invention.

As shown in FIG. 2, a location selecting marker 20 is marked on the composite film 22 for properly loading the composite film inside of the compartment of the camera and verifying whether the pre-developed composite background image is correctly located. A camera user can verify the position of the location selecting marker 20 by looking through a peephole 26 disposed on the back cover 6 of the camera.

The location of peephole 26 for verification coincides with the position of the location selecting marker 20. When a film lever 34 is wound, a film driver 36 and a film digital panel are advanced for the next picture.

Because the film driver 36 rewinds the completed film, the camera user must set the location selecting marker 20 coinciding with the peephole 26 for properly composing the secondary image to the primary image when the next film is loaded.

Even thought the peephole 26 closely contacts the composite film, the peephole 26 disposed on the back cover 6 of the camera has an overlap cover 40 so as not to allow penetration of light from outside. The overlap cover 40 forms a seal such as a sticker for simple and confident blocking of the peephole 26 so as not to allow penetration of light.

Figure 3:
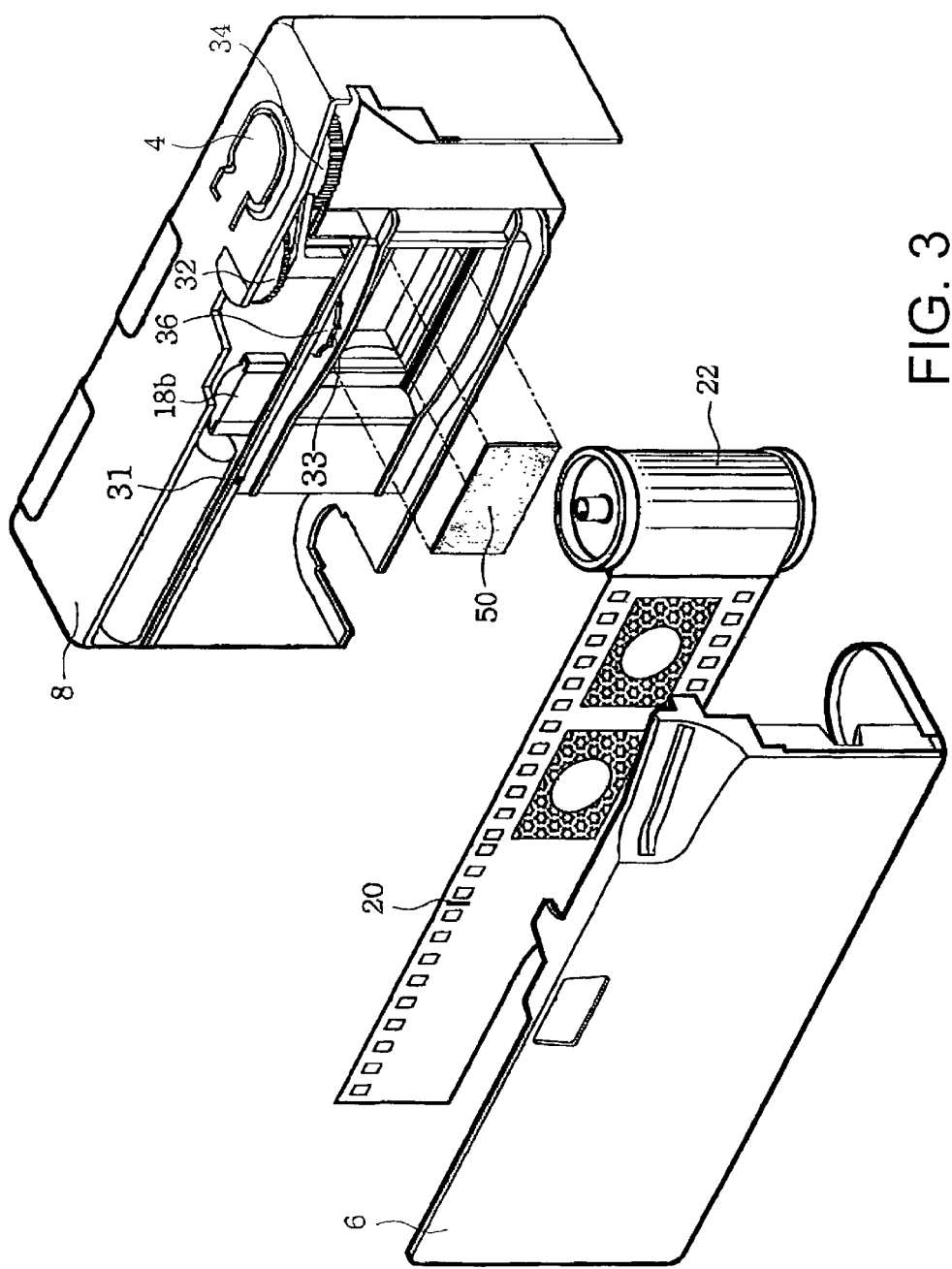
FIG. 3 is a modification of the disassembled camera for composite photography of the present invention.

Another embodiment of the present invention, a plurality of base location selecting markers 31, 33 are formed at the contacting position of the case 8 and the composite film 22 as shown in FIG. 3. The photographer must set the base location selecting markers 31, 33 coinciding with the location selecting marker 20 of the composite film 22 for properly composing the secondary image to the primary image when a composite film is loaded. The base location selecting markers 31, 33 could be marked on the film driver 36 or the main body of the camera as shown in FIG. 3.

The composite camera of the present invention has a gradation filter 50 being disposed between the composite film 22 and the lens 21. A gradation filter 50 gives a gradation effect to gradually darken the picture toward the primary image when the secondary image of the object is taken for composing the pre-developed primary image. Due to the gradation effect, the composite photography looks natural. The gradation filter 50 forms a light blocking portion having a semi-transparent or opaque print on a transparent panel or a linear or triangular protrusion inside of a circular frame.

Although the present invention has been fully described with respect to a portable or disposable camera having a first location designator, second location designator and non-adjustable iris diaphragm with the accompanying drawings, it is to be noted that various changes, modifications and applications to regular cameras will be apparent to those skilled in the art. Such changes applications and modifications would not depart from the scope of the present invention, and are within the scope and spirit of the present invention.

What is claimed is:

1. A camera for composite photography, comprising:
   a main body having a case and a back cover, a front face of said main body having a front finder window for composition and a lens, a rear face of said main body having a rear finder window for composition, a composite film being loadable inside of said main body, and a non-adjustable iris diaphragm,
   a first location designator inserted in front of said lens for locating an object of a picture on said composite film through the lens, said first location designator having a location designating hole,
   a second location designator for locating an object of a picture on the composite film, said second location designator being disposed on either one of said front or rear finder window, and further comprising a location selecting marker being marked on the composite film, and
   wherein a peephole is disposed on the back cover for verifying the location of said location selecting marker.

2. The camera for composite photography as claimed in claim 1, wherein a diameter of said location designating hole is smaller than that of the lens.

3. The camera for composite photography as claimed in claim 1, wherein a corner of said second location designator is cut off, thereby the object being exposed through the corner.

4. The camera for composite photography as claimed in claim 1, further comprising a gradation filter being disposed between the composite film and the lens for gradation effect.

5. The camera for composite photography as claimed in claim 1, further comprising an overlap cover on the peephole to freely open and close for blocking light.

6. The camera for composite photography as claimed in claim 1, further comprising a composition marker being disposed on either one of said front finder window or rear finder window for positioning an image.

7. The camera for composite photography as claimed in claim 1, further comprising a slider being disposed on said first location designator slideable along a horizontal direction for positioning said location designating hole above the lens to focus the object on the composite film.

8. The camera for composite photography as claimed in claim 1, further comprising a base location selecting marker at a contact position of said case and the composite film for verifying the position of said location selecting marker.

* * * * *